INVENTORS.
JAMES J. SWARTZ
WALTER E. SEAMAN
BY Parker & Carter
ATTORNEYS.

June 5, 1951 J. J. SWARTZ ET AL 2,555,617
MILLING FIXTURE FOR AUTOMATIC CHUCKING MACHINES
Filed Feb. 24, 1948 4 Sheets-Sheet 2
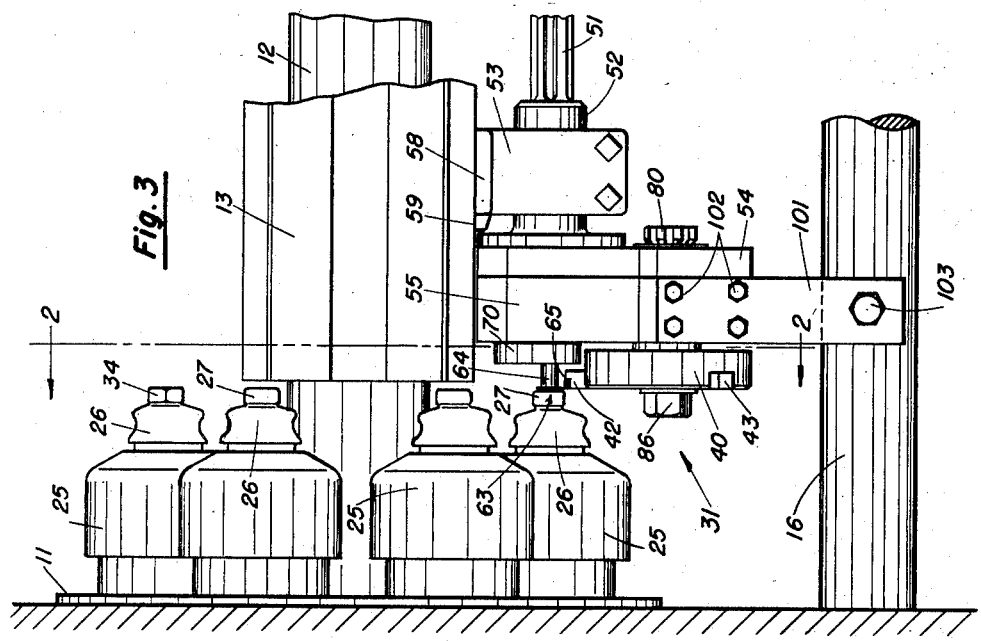
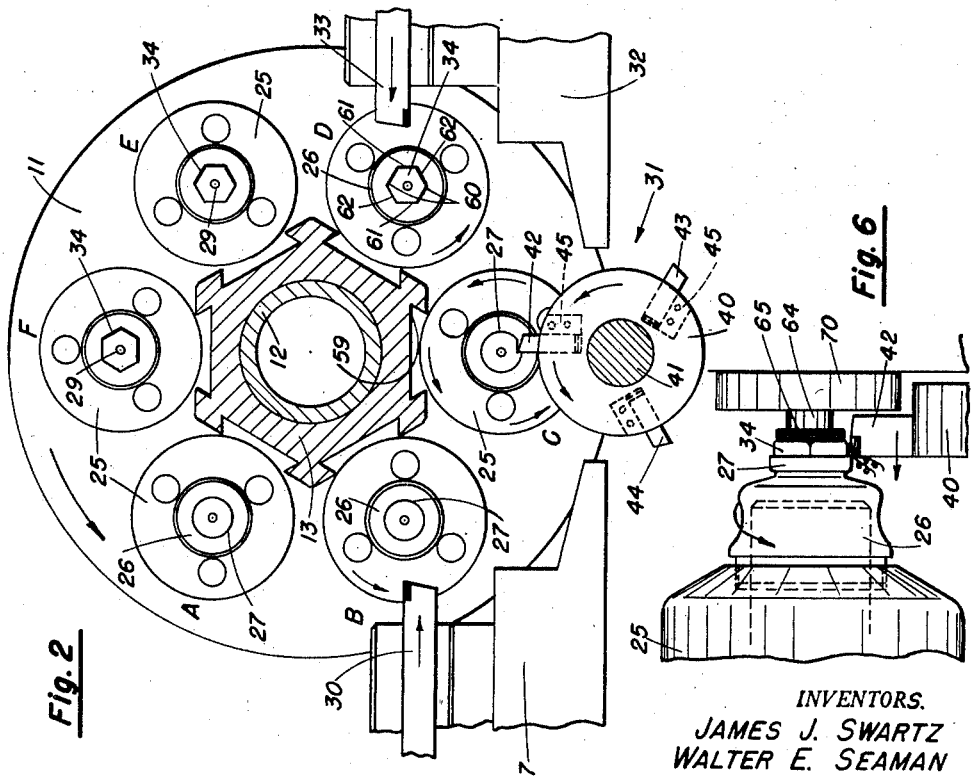
INVENTORS.
JAMES J. SWARTZ
WALTER E. SEAMAN
BY Parker Carty
ATTORNEYS.

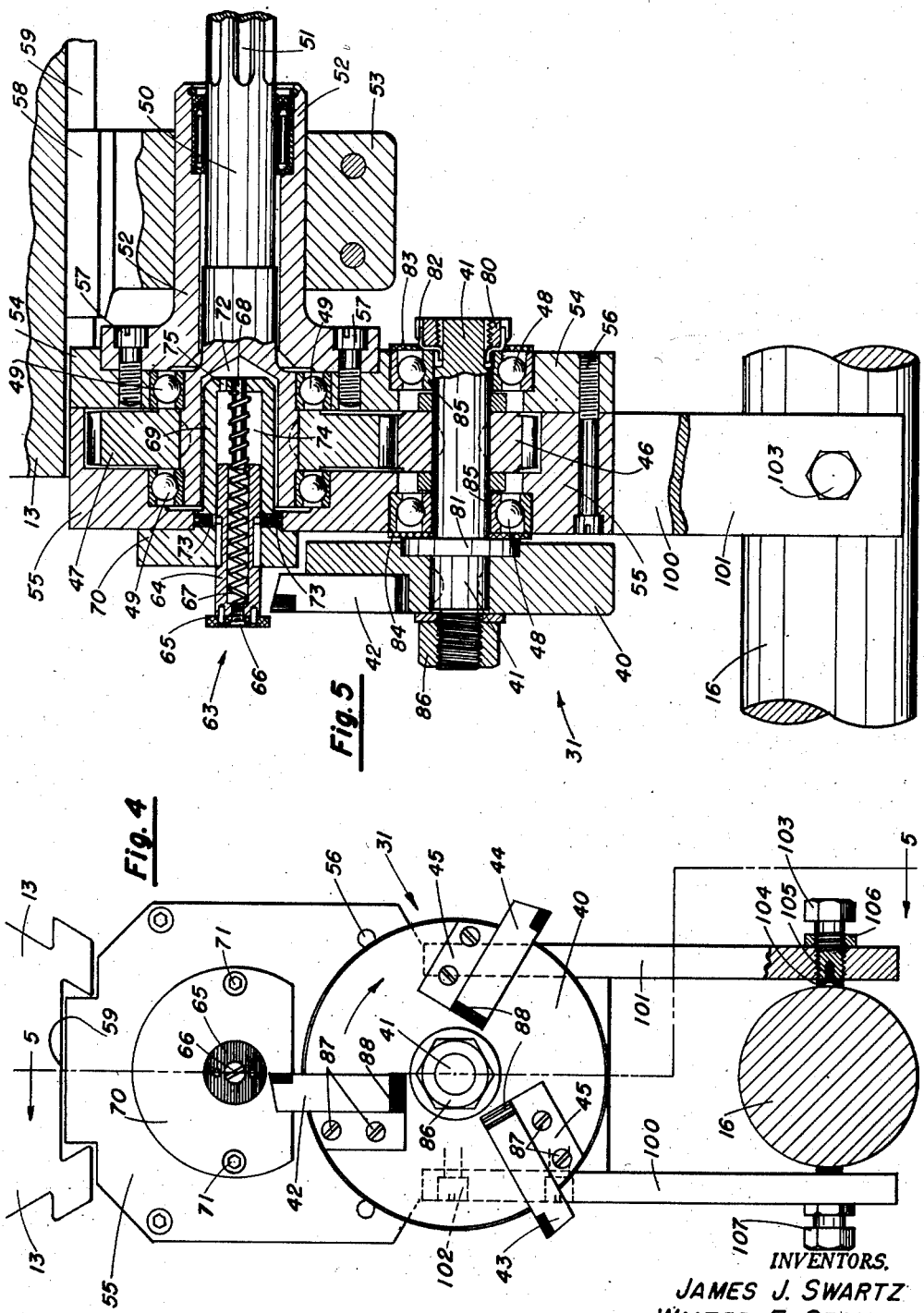

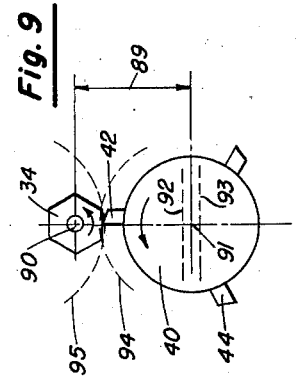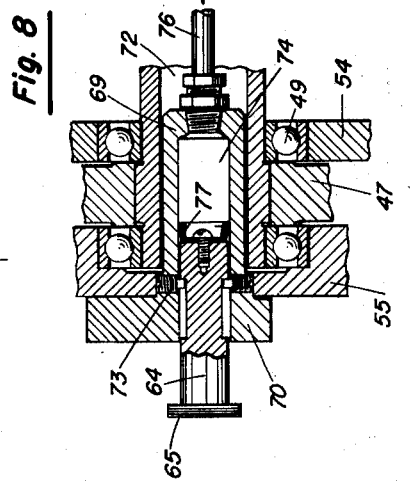

Patented June 5, 1951

2,555,617

UNITED STATES PATENT OFFICE 2,555,617

MILLING FIXTURE FOR AUTOMATIC CHUCKING MACHINES

James J. Swartz, Berwyn, and Walter E. Seaman, Chicago, Ill., assignors to Sloan Valve Company, Chicago, Ill., a corporation of Illinois Application February 24, 1948, Serial No. 10,544

13 Claims. (Cl. 29—38)

This invention relates in general to automatic chucking machines and particularly to machines having an indexible spindle carrying a plurality of work rotating chucks, together with a plurality of rotatable and endwise movable tools adapted to simultaneously perform work on metal parts at the different indexed positions.

The principal object of the invention is to provide a new and improved mechanism or fixture for an automatic chucking machine in which nuts or flat sides on polygonal shapes are produced upon a blank metal part supplied to the machine.

It is a further object of the invention to provide a new and improved automatic chucking machine and milling fixture mechanism in which a metal part having a nut blank formed thereon is worked upon in different indexed positions and is arranged to have a nut cut from the nut blank in one of the positions of the machine.

An important feature of the invention resides in the provision and arrangement of a novel cutting tool and attachment for milling polygonal shapes such as nuts, and having several cutting blades which revolve at a greater speed than that at which the blank is rotating and in the same direction thereof, and in which the cutting tool is fed progressively in tangential contact with the blank, milling oppositely disposed flat surfaces to form the nut as the cutting tool and nut are simultaneously rotating.

In machines and mechanisms of the aforesaid type it was difficult, if not impossible, to mill accurate and true, flat surfaces upon a polygonal shaped part. This was due primarily to a combination of faults such as slight inaccuracies and errors in the assembly of the various machine elements, slack or backlash in the gears and drive shafts, wabble and chatter in the cutting tools, loose adjustments, and other difficulties inherent in automatic chucking machines. As a result, instead of a polygonal part having smooth and true flat sides, the sides would be slightly concave or convex, and also be scored and grooved by the chatter and wabble of the cutting tools, rendering the part usually unfit for use and not suitable for polishing or plating if this was required.

It is accordingly a further object of the present invention to provide means in a machine of the type described whereby accurate and smooth flat sides are cut upon a polygonal shape at all times by the cutting tools.

The foregoing objects and other advantages not specifically enumerated and consisting in certain novel features and details of construction, combinations and arrangements of parts, will be apparent from the detailed description of the invention and as set forth in the appended claims.

This application is in the nature of an improvement on co-pending application Serial No. 764,623, filed July 30, 1947, for Milling Fixtures for Automatic Chucking Machines, James J. Swartz.

The accompanying four sheets of drawings illustrate a preferred embodiment of the invention wherein:

Fig. 2 is a view of the spindle end of the machine taken along the line 2—2 of Fig. 3 showing the invention;

Fig. 3 is a side view of Fig. 2 showing a portion of the machine contingent to the spindle;

Fig. 4 is an end view of the novel fixture of the invention on a larger scale and viewed from the left side of Fig. 5;

Fig. 5 is a cross-sectional view taken along the line 5—5 of Fig. 4;

Fig. 6 is a fragmentary view of a step in the method of cutting flat surfaces on a polygonal shaped part;

Fig. 7 is a side view of the gear housing and support of Fig. 5;

Fig. 8 is a cross-section of a modification of a gear friction means;

Fig. 9 is a diagrammatic showing of the method of operation; while

Fig. 10 is a perspective view of a work piece having two opposite flat sides milled thereon.

Figure 1:
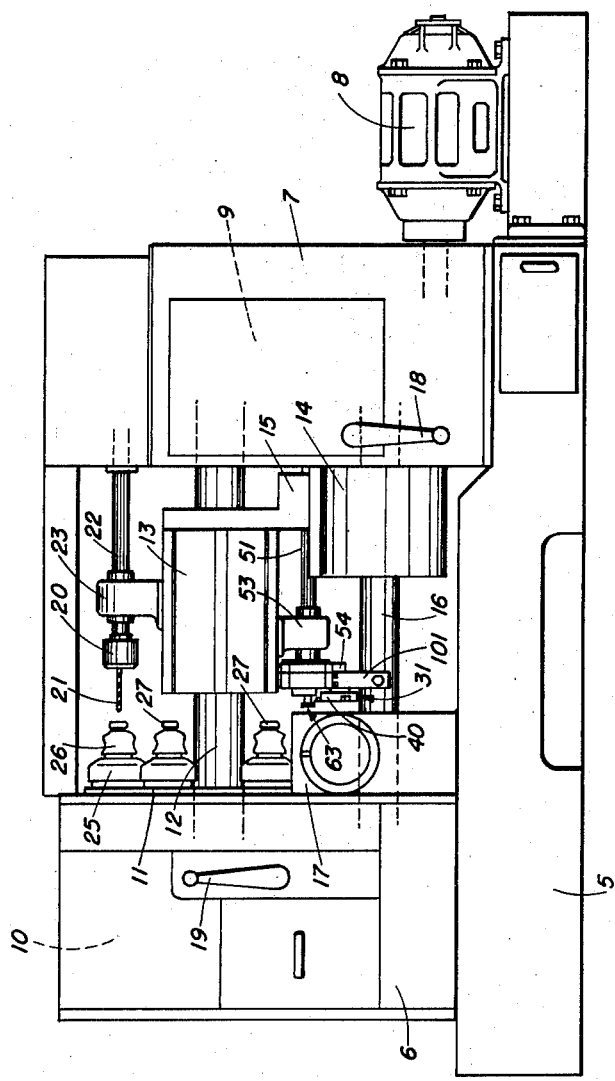
Fig. 1 is a side view of an automatic chucking machine on a small scale showing the invention applied thereto.

While the invention is applicable to many known types of automatic chucking machines, it lends itself particularly well to such well known machines as are manufactured by the New Britain Machine Company, New Britain, Connecticut. These are generally known as the Model #65 New Britain Automatic Chucking and Work Rotating Machines, and are arranged to progressively perform work on various metal parts. Since the detailed construction and operation of the machines are generally well known to those skilled in the art, it has not been thought necessary to illustrate or point out all the detailed elements or operating features except as they affect the operation and association of the elements with which the present invention is concerned.

Referring now to the drawing, Fig. 1, this shows a front view of an automatic chucking machine embodying the invention and includes a supporting base 5 usually enclosing a chip conveyor, and having vertical side enclosures and supports 6 and 7. An electric driving motor 8 for the machine is also supported on base 5 and drives a series of gears located within the power box 9 for operating the various elements of the machine. On the left hand side, the indexing mechanism 10 for positioning the spindle carrier 11 is located, and the drive shaft for this mechanism passes axially through the tool slide sleeve 12 from the enclosure 7 to 6. Slidably arranged on the tool slide sleeve 12 is a tool slide 13 adapted to be moved laterally towards the spindle carrier 11 by the tool slide drum cam 14 through the medium of the tool slide bracket 15. The tool slide cam 14 is driven by a shaft 16 from the gearing in power box 9 which shaft also serves to provide the motive power for a number of cross slide tools such as 17. Manual control of the machine is provided by the clutching lever 18 which connects the driving motor 8 with the gearing 9 and thereby controls the various tools, and the indexing lever 19 for controlling the manual indexing of the spindle carrier 11.

As is the usual practice, the tool slide 13 supports a number of tools, each of which is adapted to rotate and perform a different operation on the work pieces held in the six different positions or stations A to F inclusive, of the spindle carrier 11, see Fig. 2. For the purposes of exemplification, a drill speeder has been shown supported in one of the positions on the tool slide. This arrangement includes a chuck 20 holding a threading tap 21 driven by the spline shaft 22 and supported on the tool slide 13 by tool holder 23. Similarly, other tools for performing drilling, forming or boring operations may be carried by the tool slide 13.

The spindle carrier 11 usually carries a series of six chucks 25 as illustrated more clearly in Fig. 2, and each chuck is adapted to hold a piece part, such as 26 for example, upon which work is to be performed. The spindle carrier 11 is indexed or rotated counter-clockwise so as to carry the chucks 25 and parts 26 sequentially through each of the six different positions or stations A to F inclusive. In the first or A position at the commencement of the machine operation, the piece part 26 is loaded or placed on the chuck 25 by the person operating the machine. The lever 19 is then operated to index the spindle carrier 11 to rotate the chuck 25 to the next position or position B, where the front cross slide 17 advances its cutting tool 30 on the work automatically to conduct a forming operation for example, on the body of piece part 26. In the next position, C, the operation concerned with the present invention is conducted, and this is the cutting of a nut 34 on the top portion 27 of the body of piece part 26, by the fixture or mechanism indicated generally by the reference character 31, as will be more fully explained hereinafter. When the spindle carrier next has indexed the part 26 to position D, the lower rear cross slide 32 operates its forming tool 33 forward to perform another operation on the body of piece part 26. In the E position, a counter bore is made in the bore 29 of the nut 34 while in the upper or F position the drill speeder 21, Fig. 1, taps and threads the bore 29 in the nut 34. The finished piece part 26 is unloaded from the chuck 25 when it is finally indexed again to position A and another part is then inserted.

After the indexing of the piece part 26 in each of the various positions, the tool slide 13 moves endwise to the left each time to carry the various rotatable tools into operative engagement and cutting relationship with the piece parts to be worked upon.

The invention presents many advantages when applied to automatic chucking machines since the cutting or milling of the smooth flat surfaces on polygonal shapes takes place simultaneously while other operations, such as drilling, tapping, shaping, etc., are being performed in the several other indexed positions of the spindle. This is particularly true when the flat sides are being milled on integral body shapes of irregular contour. Considerable labor and time are thereby conserved, resulting in economies in cost of mass production of the work pieces.

Referring now more particularly to the drawings, Figs. 2 and 3, the fixture or mechanism indicated generally by the reference character 31 is adapted to automatically mill a hexagonal nut 34 on the piece part or cover 26 from a nut blank 27 formed on the cover. When the blank nut 27 is indexed to the C position, it is of circular form as shown, and after it leaves this position and has the work performed upon it, it is indexed to the D position with the six flat sides milled in it in the form of the nut 34.

The mechanism 31 is arranged in the automatic chucking machine opposite the third or C position of the spindle carrier 11, and on the tool slide 13. It includes a circular tool holder 40 securely attached or bolted as shown, for rotary motion to the shaft 41, and is provided in the example with three sets of cutting tools 42, 43 and 44, which are clamped in the usual manner by the clamps 45 to the holder 40. The tool holder shaft 41 is keyed to a gear 46, which gear in turn is driven by a larger gear 47, both gear shafts being provided with double sets of ball bearings 48 and 49. The gear 47 is attached to shaft 50 which is part of the splined shaft 51 extending into the power box 9 where the motive power for turning the shaft 51 originates. The shaft 50 turns in sleeve shank 52, rigidly clamped as shown by bolts to the tool holding member 53, which member serves to carry the complete fixture 31. The gears 46 and 47, as well as the associated ball bearings 48 and 49, are clamped between a pair of plates 54 and 55 by suitable bolts such as 56, extending through opposite sides thereof and the whole mechanism is supported by bolts 57 from the shank 52. The tool holding member 53 is clamped at the top in well-known manner at 58 to the lower angular slot 59 formed in the tool slide 13. In this manner, the entire fixture 31 is rigidly supported from the tool slide and controlled thereby.

In the example illustrated, the gear ratio between the small gear 46 and large gear 47 is exactly two to one, and it will be noted that the axis of rotation of gear 47 and shaft 50 is coincident and directly in line with the axis of the chuck 25, the piece part 26 and the nut blank 27, in the lowermost indexed position C of the spindle carrier 11. The speed of rotation of the chuck and piece part 26 is exactly the same as that of shaft 50, and since the tool holder 40 is attached to gear 46, the tool holder will rotate at a speed twice or double that of the nut blank 27. The direction of rotation of the chuck 25 and therefore the nut blank 27 is counter-clockwise, as shown by the arrows in Fig. 2, and the tool holder 40 also rotates in the same counter-clockwise direction. However, since the rotative axis of the nut blank 27 is displaced in a different plane but parallel to that of the axis of rotation of the tool holder 40, it will be obvious that as viewed in Fig. 2, the cutting tool 42 will be moving tangentially against the periphery of the nut blank 27 and in the opposite direction thereof at the point of contact.

Assume now in the sequence of operations that the spindle carrier 11 has indexed a piece part 26 carrying a blank nut 27 to position C, as viewed in Fig. 2, and that these parts are rotating in a counter-clockwise direction, as indicated. The tool slide 13 will then operate to move the fixture 31 inward or to the left as seen in Fig. 3, and the drive shaft 51 being operated continuously, the tool holder 40 will also be rotating in the same counter-clockwise direction. As the mechanism 31 is moved toward the spindle carrier, the rotating cutting tools 42, 43 and 44 will gradually approach and tangentially assume a cutting position with relation to the nut blank 27. Tool 42 will cut or mill a flat shaving from the nut blank 27 as the tool tangentially contacts the surface of the nut blank, and as it is rotating past it, while simultaneously the nut blank is turning in the opposite direction at the point of contact therewith. When the next cutting tool 43 contacts and mills the nut blank 27, the flat portion previously cut by the tool 42 will have moved in a counter-clockwise direction the distance equivalent to one of the flat sides of a hex nut. When cutting tool 44 subsequently contacts the surface of nut blank 27, it will mill a flat piece in the next portion of the nut blank following that milled by tool 43. Subsequently cutting tool 42 will again mill the surface of the nut blank 27, but at this time the nut blank will have turned or rotated a distance of 180 degrees and presented its opposite side for cutting from that which the cutting tool 42 first contacted and milled.

As the nut blank 27 and tool holder 40 continue to simultaneously rotate, the cutting tools 42, 43 and 44 progressively cut deeper into the sides of the nut blank as the tool slide 13 moves the tool holder 40 inward, each of the cutting tools continuing to cut upon the same oppositely disposed flat sides on the nut blank 27 until the limit of the progressive movement has been reached and the tool slide 13 is stopped. This progressive milling operation is partially shown in Fig. 6 where the cutting tool 42 is shown in the act of cutting into the nut blank 27. As shown in the position D, Fig. 2, the finished nut 34 has been provided with hexagonal milled sides, with the cutting tool 42 having cut the two oppositely disposed flat sides 60 on the nut, the cutting tool 43 the flat sides 61, while the cutting tool 44 has cut the opposite flat sides 62.

As pointed out, the speed of rotation of the tool holder 40 is twice that of the nut blank 27 and therefore with the three cutting tools shown, the hexagonal flat sides are thereby cut. It will be obvious therefore that if only one tool 42 were provided on the tool holder 40, and with the same speed and gear ratio present, only a single pair of oppositely disposed flat sides would be cut on the blank nut 27. Also to mill a hexagonal nut with only one cutting tool, it would be necessary to increase the speed of rotation of the tool holder 40, six times that of the speed of the work part 26. However, this high rate of speed would be impractical for commercial use. It will also be obvious that by varying the speed of rotation of the blank nut and tool holder 40, various multiples of 2, 4, and 6 flat sides could be cut on a piece part, or by varying the number of tools on the tool holder a variable number of flat sides could be milled to form a polygonal shaped part.

Although the mechanism 31 has been illustrated as shown in connection with the production of hexagonal nuts 34 on a piece part 26, it will be understood that other polygonal objects may be formed with oppositely disposed flat parts for various other purposes. For example, Fig. 10 shows what is commonly known as a vacuum breaker for use in plumbing fixtures. This comprises a cylindrical body 78 provided with internal and external screw threads for connection to suitable piping and fittings, and in order to assemble the same, it must be provided with oppositely disposed flat surfaces 79 and 79' for the accommodation of a wrench. This vacuum breaker may be readily machined and milled with the flat sides on the fixture 31 disclosed by this invention, by choosing the correct rotational speed and number of cutting tools.

The foregoing mechanism and its operation upon polygonal shapes produces flat sides or surfaces which are generally commercially acceptable. For example, when hexagonal nuts are made on irregular shaped bodies, the flat sides of these nuts would be suitable for the application of a wrench to assemble the body part. It will be appreciated that automatic chucking machines comprise numerous gears, bearings, drive shafts, and other mechanisms, and that consequently a certain amount of gear backlash and end play of the drive shafts, as well as other inaccuracies, are inherent in these types of machines. Accordingly, it is relatively difficult to accurately machine polygonal shapes so that the surfaces would be approximately true and flat. Under such conditions, as the cutting tools wear, and when slack is produced throughout the machinery, also due to wear, the flat sides tend to be milled slightly convex or concave, and instead of a smooth surface being machined upon the work piece, there will be grooves and marks of the cutting tool upon it.

In many instances, it is desirable, if not absolutely necessary, that the polygonal shaped members have accurate, true and flat surfaces, such surfaces being suitable for buffing, polishing and subsequently plating operations. To produce a satisfactory plating surface upon a work piece, there must be no grooves, cutting teeth chatter, or other marks upon it.

In accordance with the present invention, several novel features are incorporated in the aforesaid type of automatic chucking machine which enables a true, accurate and flat surface to be machined on the flat sides of polygonal shapes, such surfaces being readily acceptable commercially for polishing and for plating finishes.

Referring now particularly to Figs. 4 and 5, a friction means indicated generally at 63 is provided for the purpose of taking up the slack or backlash in the gearing of the chucks 25 and spindle mechanism 11, carrying the work pieces 27. As seen in Fig. 3, the friction mechanism 63 is adapted to axially engage the work piece 27 frictionally prior to the cutting operation by the cutting tool 31. This friction mechanism comprises a plunger 64 having a fibre disc 65 on its front end for direct contact engagement with the work piece 27, the disc being firmly secured to the front end of the plunger 64 as by screw 66, so that there is no relative rotation between them. The friction disc 65, as stated, is in axial alignment with the chuck 25 and the work piece 26, and is of sufficient diameter so as to almost cover the rotating end of the work piece 27 without interfering with the cutting action of the cutting tool blades 42, 43 and 44. The plunger 64 is hollow to accommodate a compression spring 67, the opposite end of which encircles a pin 68, which is securely fastened to the bottom of a sleeve 69 formed in the mounting or supporting plate 70. The mounting plate 70 in turn is attached, as by bolts 71, directly to the cutting tool supporting plate 55, as seen in Fig. 4. Sleeve 69 is recessed within the chamber 72, formed axially within the drive shaft 50 of gear 47, but does not rotate with the shaft. To prevent rotation of the friction disc 65 by the work piece which it engages, a pair of set screws 73 are provided which thread into the sleeve 69 and enter slots formed in plunger 64. Limited reciprocating action of the plunger 64, however, is permitted by the set screws 73. In order that oil may escape from the chamber 74, formed within sleeve 69, an opening 75 for the oil surrounding these elements is provided.

The operation of the friction mechanism is such that as the tool slide 13 moves towards the spindle 11, carrying the tools including cutting tool 31, the friction disc 65 axially engages the outer surface of the work piece 27, thereby immediately taking up the backlash in the gears of the chuck and spindle prior to the engagement of the cutting tool blades 42, 43 and 44, so that the cutting tools can immediately cut into the work piece without first taking up the slack in the gears or causing chattering and such other action that would cause an irregular cut or groove to be cut into the work piece upon which the flat surface is being cut. The compression spring 67 applies uniform pressure of the friction disc 65 to the work piece throughout the cutting operation, and including the intervals between the sequential engagement of the cutting tool blades on the tool holder 40 with the work piece. The amount of friction applied to the work piece is, of course, not sufficient to interfere with the smooth positive operation of the mechanism.

Fig. 8 shows a modification of the friction means in which hydraulic or air pressure is utilized to provide uniform friction against the work piece in place of the compression spring 67 of Fig. 5. The plunger 64, carrying friction disc 65 on its front end, is reciprocated within chamber 74 of sleeve 69, and its stroke limited by set screws 73. An air or fluid supply line 76 leads into chamber 74 and the fluid is adapted to exert uniform pressure against the piston packing 77, forcing the friction disc 65 against the work piece when it engages the same.

As shown in Fig. 5, the pairs of preloaded bearings 48 for the cutting tool driving gear 46, are arranged so that they prevent end play in the drive shaft or arbor 41. The bearings are given an angular thrust by sleeves 85 between the end nut 80 and the shoulder 81 formed on shaft 41, a lock washer 82 being provided to prevent loosening of the nut 80. This arrangement also assists in taking up a certain amount of backlash in the drive gears 46 and 47. The nut 86 firmly clamps the tool holder 40 to the shoulder 81 on shaft 41 independent of the nut 80. To further assist in reducing play between the bearings and gearing, a pair of fibre friction discs 83 and 84 are applied to the outside ends of each of the preloaded bearings 48. This provides additional resistance or friction to the bearings. The friction discs 83 and 84, in addition to reducing the backlash of the drive gears, prevent the cutting tool blades 42, 43 and 44 from "jumping" or accelerating their rotation immediately after performing a cutting operation on the work piece and between successive cutting operations. Thereby a more true, smooth and flat surface is milled.

Referring now particularly to Fig. 4, as well as Fig. 9, it will be seen that the axis of rotation of the cutting tool arbor or drive shaft 41 is fixed and not adjustable with respect to the axis of work piece 27. The work piece, which in Fig. 4 is axially in alignment with the friction disc 65, is indexed by the spindle carrier 11, and when in the indexed position at which the cutting tool 40 performs its work, this work piece will be fixed axially as it rotates. Therefore, the relative axis of the work piece and the cutting tool are a fixed distance apart and not adjustable with respect to each other. This is an important feature since this fixed distance insures at all times that a true flat surface is cut on the polygonal shape, such as the hexagonal nut 34, illustrated. In order, now, to compensate for wear upon the cutting tool blades 42, 43 and 44, the adjusting blocks 45 are provided, and by loosening the clamping screws 87, the tools may each individually be adjusted outward or inward any amount with respect to the circumference of the rotating tool holder 40, depending on the wear of the tools. In order also to maintain the adjusted setting, the shims 88 are provided at the rear ends of the cutting blades and any number may be added or taken off to provide the correct adjustment. In this manner, the center distances between the work piece and the rotating tool holder are always maintained constant, whereas formerly it was necessary when the tools wore down to compensate for the same by swinging the entire cutting tool holder 40 about an axis relative to the work piece. This presented difficulties because when this was done and the tools gradually wore, the deviation from the cutting of a flat surface was considerable, and eventually resulted in either convex or concave surfaces being cut.

The foregoing is diagrammatically illustrated in Fig. 9 where the reference character 89 represents the fixed center-line distance between the rotating axis of the tool holder 40 and the work piece 34, and this distance is at all times maintained constant, the centers being indicated by reference characters 90 and 91. Should, for example, this center distance 91 be shifted upwardly to the dotted line 92, as was done formerly when the tools wore out, an arc 94, for example, would be traversed by the cutting tool, resulting in the formation of a concave surface 94 on the work piece 34. If the center 91 was shifted downward to the line 93, a convex surface 95 was cut on the work piece. In the former type of cutting tools, instead of having each cutting tool blade 42, 43 and 44 individually adjustable, a circular cutting tool was provided having a number of fluted cutting teeth formed integral with the tool, which was directly attached to the rotating shaft or arbor. In this type of cutting tool, it was necessary to shift the center 91 about the axis 90 of the work piece or some greater distant axis.

Another important feature of the invention resides in the means for guiding and steadying the rotating cutting tool holder 40 to prevent chatter of the cutting tools as they cut into the work and thereby cause grooves and uneven rough surfaces on the part being cut. As has been pointed out, the mounting plates 54 and 55, which support the cutting tool 31, are carried by holding member 53 in turn supported on the tool slide 13. Since this mechanism hangs downward from the tool slide 13, some means must be provided to steady the same, and also prevent any tendency of the milling fixture to rotate about the axis of the tool slide 13. Referring to Figs. 4 and 5, this means comprises a pair of guide or straddle bars 100 and 101, arranged on opposite edges on the mounting plate 55, to which they are attached as by several screws 102, as shown in Fig. 7. These guide bars straddle the tool slide cam shaft 16, which rotates to drive the drum cam 14 and frictionally engage the rotating surface of cam shaft 16. They are maintained in fixed relation thereto by means of an adjustable bolt, such as 103 on the guide bar 101. The contact surface of the bolt 103 is in the form of a friction disc 104, preferably of fibre, which is secured to the shank on the bolt 103 as by screw 105. A lock nut 106 may be provided to hold the adjustment. The adjusting bolt 107 of guide bar 100 is similarly arranged. The purpose of these guide or straddle bars, as stated, is to prevent misalignment of the cutting tool with respect to the work piece it is operating upon, and eliminate torsional stresses so that accurate flat surfaces are cut. They also assist in preventing chatter and shimmying of the tools by steadying the fixture at another point opposite its support on the tool slide 13. The guide bars in addition assist in the assembly of the fixture by guiding the same in position so as not to interfere with the cross slide tools 17 and 32, seen more clearly in Fig. 2. Furthermore, since they are adjustable by bolts 103 and 107 on the drive shaft 16, the maintenance of the rotative axial center of the cutting shaft 41 is at all times insured.

Referring now particularly to Fig. 7, a further means is disclosed assisting in reducing or eliminating any backlash or slack in the gearing 46 and 47. This comprises filling the chamber or recess 108 in the bracket 55 within which the gears revolve, with a lubricating oil. The plate 54 covers and encloses the gears, as seen in Fig. 5. An oil pocket 109 is provided in the plate 55 immediately below the bottom side of gear 46, the purpose of which is to catch the oil which is forced into this pocket by the rotation of the gears in the manner of a pump and piling up the oil in this pocket. This pressure created in pocket 109 assists in providing a retarding effect upon the rotating gears 46 and 47 by creating a back pressure and thereby further insuring that no looseness or backlash can take place in the gears.

It is necessary that the gear recess 108, as well as oil pocket 109, be kept full of lubricant at all times and under a given pressure in order that this lubricant will be effective to act as a retardant on the gears 46 and 47 and thereby prevent backlash. This is particularly important in the milling, for example, of two oppositely disposed flat surfaces on a work piece such as that shown in Fig. 10 where the cutting tools, during a portion of their rotation, are not in direct cutting engagement with the work piece, resulting ordinarily in "jumping" of the tools and the consequent formation of grooves or rough cuts on the flat surfaces. The gear train must therefore be free at all times of any backlash effect. To maintain the gear case 108, as well as the pocket 109, continually full of lubricant, an external reservoir is provided in the form of a container 110, filled partially as at 112, and connected by a suitable pipe 111 to the gear recess 108 at a point 113 preferably between the two gears 46 and 47. At the top of the gear case another pipe 114 connects with the top of the reservoir 110, so that the whole arrangement functions in the manner of an oil pump. The reservoir 110 is preferably mounted on the chucking machine in a position so that the level or head of the lubricant 112 will be elevated above the top of the gear case 108 to provide a suitable pressure head.

During operation of the gears the lubricant becomes slightly heated due to gear friction and consequently expands, the excess being forced up the pipes 111 or 114 into the reservoir 110 to raise the level 112. During cooling of the machine when subsequently idle, or due to losses incurred by seepage or otherwise, the gear case is replenished from the reservoir automatically. As the gears 46 and 47 revolve, oil is forced under slight pressure up the pipe 114 from the gear case into the top of the reservoir 112 and then flows by gravity through the pipe 111 back to the gear case, thereby maintaining the level of lubricant constant to act as a backlash retardant. A float and indicator 115 may be provided to indicate the level oil 112 in the reservoir 110. The retarding effect of the lubricant upon the gears and the cutting tools results in the production of extremely smooth flat surfaces on the work piece which are entirely free from chatter marks and grooves.

The foregoing features, it will be clear, all mutually cooperate with each other and are necessary collectively to provide a rotating cutting means that will insure the cutting of accurate, true and flat surfaces on the work piece having no grooves, chatter marks, or rough surface finishes so that the work pieces may be readily polished and plated without requiring additional machining operations. It is the particular features pointed out which make it possible for an automatic chucking machine to produce flat-sided polygonal shapes having smooth flat surfaces commercially acceptable for the exacting finishes required on polished or plated surfaces.

From the foregoing description, it will be seen that applicant has designed a novel fixture and mechanism for cutting flat sides on polygonal shaped objects which may be placed into an automatic chucking machine and simultaneously have various other operations performed on them in the several indexed positions of the machine, and while only one embodiment of the invention has been illustrated and described, it will be understood that other variations of the same may be evolved by those skilled in the art. It is therefore desired that the invention be not limited to the precise disclosure but only to the extent of the appended claims.

What is claimed is:

1. In an automatic chucking machine, a spindle carrier adapted to be indexed and having a plurality of chucks for holding work pieces, a tool slide movable toward and away from the spindle carrier and supporting a plurality of tools adapted to perform various operations on said work pieces in the different indexed positions, gear means for rotating said chucks at a certain speed, a cutting tool on said tool slide for cutting polygonal surfaces on said work pieces at one of the indexed positions, gear means for rotating said cutting tool at a different speed than said chucks as the cutting tool operates upon the work piece, and friction means on said tool slide in axial alignment with said work piece engaging said work piece as the cutting tool operates upon the same so that backlash in the spindle and chuck gears is taken up as the cutting tool cuts into the work piece, said friction means comprising a plunger having a friction disc rigidly supported on the end thereof resiliently urged against said work piece, and stop means on said plunger for preventing axial rotation of said friction disc.

2. In an automatic chucking machine, a spindle carrier adapted to be indexed and having a plurality of chucks to which work pieces are supplied one at a time for machinery, a tool slide movable toward and from the spindle carrier and supporting a plurality of tools adapted to perform operations on said work pieces in each of the different positions in which the work piece is indexed, gear means for continuously rotating said chucks at a definite speed, cutting means on said tool slide for cutting polygonal surfaces on said work piece when the work piece is at one of the indexed positions, gear means for rotating said cutting means at a greater speed than said chucks, and friction means on said tool slide in axial alignment with said work piece and adapted to engage said work piece prior to the time said cutting tool engages the work piece to take up the backlash in the spindle and chuck gears.

3. In an automatic chucking machine, a spindle carrier adapted to be indexed and having a plurality of chucks for holding work pieces, a tool slide movable towards and away from said spindle carrier and supporting a plurality of tools adapted to perform various operations upon said work piece in each of the different indexed positions, gear means for rotating said chucks at a certain speed, a rotating cutting tool on said tool slide for cutting polygonal surfaces on said work pieces at one of the indexed positions, gear means for rotating said cutting tool at a higher speed than said chucks as the cutting tool operates upon the work piece, and resilient friction means on said tool slide in axial alignment with said rotating work piece engaging said work piece at a time prior to the cutting engagement of said cutting tool with said work piece to take up backlash in the spindle and chuck gears.

4. In an automatic chucking machine, a spindle carrier adapted to be indexed and having a plurality of chucks for holding work pieces, a tool slide movable towards and away from said spindle carrier and supporting a plurality of tools adapted to perform various operations upon said work piece in each of the different indexed positions, driving gear means for rotating said chucks at a certain speed, a rotating cutting tool holder on said tool slide, a plurality of cutting tools circumferentially spaced around said tool holder for cutting flat surfaces on said work piece at one of the indexed positions, gear means for rotating said tool holder at a different speed than said chucks as the cutting tools operate successively upon the work piece to cut the flat surfaces, and friction means on said tool slide engageable with said work piece to take up backlash in the spindle gears between the successive contact of the cutting tools with the work piece, said friction means engaging said work piece prior to the time the cutting tools operate upon the work piece and comprising a friction disc resiliently urged forward by the tool slide in axial alignment with and against said work piece with uniform pressure, and stop means for preventing axial rotation of said friction disc.

5. In an automatic chucking machine, a spindle carrier adapted to be indexed and having a plurality of chucks for holding work pieces, a tool slide movable towards and away from said spindle carrier and supporting a plurality of tools adapted to perform various operations upon said work piece in each of the different indexed positions, driving gear means for rotating said chucks at a certain speed, a rotating cutting tool holder on said tool slide, a plurality of cutting tools circumferentially spaced around said tool holder for cutting flat surfaces on said work piece at one of the indexed positions, gear means for rotating said tool holder at a different speed than said chucks as the cutting tools operate successively upon the work piece to cut the flat surfaces, and friction means engageable with said work piece to take up backlash in the spindle gears between the successive contact of the cutting tools with the work piece, said friction means engaging said work piece prior to the engagement of the cutting tools with the work piece and applying uniform pressure thereto as the cutting tools operate upon it, said friction means being carried by said tool slide in axial alignment with said work piece when said work piece is indexed to the position where it is operated upon by said cutting tool.

6. In a fixture for use on an automatic chucking machine wherein the chucking machine is adapted to index work pieces into a position to be worked upon from said fixture, a supporting frame for said fixture attached to said chucking machine, a tool holder on said supporting frame having a plurality of cutting tools arranged thereon in spaced relationship, gear means in said supporting frame for rotating said tool holder whereby said cutting tools successively engage said work piece to cut flat sides thereon, friction means on said supporting frame arranged in axial alignment with said work piece and adapted to resiliently engage said work piece in advance of the cutting tools for taking up backlash in the driving means for the work piece, said friction means comprising a plunger having a friction disc on one end for engaging the work piece and a spring on the other end for resiliently urging said plunger outward from said supporting frame, and cooperating means on said plunger and supporting frame for limiting the movement of said plunger.

7. In an automatic chucking machine, a spindle carrier adapted to be indexed and having a plurality of chucks for holding work pieces, a tool slide movable towards and away from said spindle carrier and supporting a plurality of tools for performing various operations upon said work pieces in the different indexed positions, driving gear means for rotating said chucks at a predetermined speed, a cutting tool supported by said tool slide for cutting polygonal surfaces on said work piece at one of the indexed positions, driving gear means for rotating said cutting tool at a different speed than said chucks as the cutting tool operates upon said work piece, friction means on said tool slide engageable with said work piece for taking up backlash in the spindle and chuck gears when said cutting tool operates upon said work piece, and preloaded bearings for the cutting tool and associated driving gear means for taking up end play of said cutting tool and backlash in said driving gear means.

8. In an automatic chucking machine, a spindle carrier adapted to be indexed and having a plurality of chucks for holding work pieces, a tool slide movable towards and away from said spindle carrier and supporting a plurality of tools for performing various operations upon said work pieces in the different indexed positions, driving gear means for rotating said chucks at a certain speed, a cutting tool holder supported on said tool slide, driving gear means for rotating said cutting tool holder at a different speed than said chucks, a plurality of cutting tools spaced around said tool holder and successively engaging said work piece in one of the indexed positions for cutting polygonal surfaces on said work piece, friction means on said tool slide engaging said work piece in advance of the cutting tools, preloaded bearings for said tool holder, said friction means and said preloaded bearings cooperating and arranged to take up backlash in the gear driving means for said chucks and said tool holder, to take up backlash between the successive engagements of the cutting tools with the work piece.

9. In a fixture for use on an automatic chucking machine, including a supporting frame having a tool holder thereon provided with a plurality of cutting tools arranged in spaced relationship and with their cutting edges extending outward, said chucking machine having driving means for indexing a work piece into the path of said cutting tools and for rotating said work piece in said indexed position, gear means in said supporting frame for rotating said tool holder, means in said chucking machine for progressively moving said supporting frame towards said work piece whereby said cutting tools are fed successively into tangential contact with the rotating work piece and each cutting tool cuts a separate flat surface thereon, friction means on said supporting frame arranged in axial alignment with said work piece and engageable therewith in advance of said cutting tools for taking up backlash in the driving means for said work piece during the successive engagements of the cutting tools, preloaded bearings in said supporting frame for taking up backlash in the tool holder gears and end play in the tool holder shaft, and friction discs engaging said preloaded bearings to assist in reducing gear backlash during intervals between the engagement of the cutting tools with the work piece.

10. In an automatic chucking machine, a spindle carrier adapted to be indexed and having a plurality of chucks for holding work pieces, a tool slide supporting a plurality of tools and adapted to move relative to said work pieces to perform a different operation upon the work pieces in each indexed position of the spindle, means for rotating the chucks and work pieces thereon, a cutting tool supported below said tool slide opposite one of the indexed spindle positions, means for rotating said cutting tool as the tool slide moves relative to said work pieces whereby flat surfaces are milled on the work pieces, a tool slide rotating drive shaft arranged parallel to said tool slide and spaced therefrom, said cutting tool being positioned between said tool slide and said drive shaft, and guiding bars attached to said cutting tool frictionally engaging said drive shaft for guiding and steadying said cutting tool in its operation whereby smooth flat surfaces are milled upon said work pieces.

11. In an automatic chucking machine, a spindle carrier adapted to be indexed and having a plurality of chucks for holding work pieces, a tool slide supporting a plurality of tools and adapted to move relative to said work pieces to perform a different operation upon the work pieces in each of the indexed positions, means for rotating the chucks and work pieces thereon, a cutting tool supported from and extending to a position below said tool slide and opposite the lowermost position on the spindle, means for rotating said cutting tool as the tool slide moves relative to said work pieces whereby flat surfaces are milled on the work pieces, a rotating drive shaft for the tool slide arranged in spaced axial relation to and below said tool slide, said cutting tool also arranged between said tool slide and said drive shaft, and a pair of guiding bars attached at one end to said cutting tool having their other ends arranged to straddle said drive shaft and in frictional engagement therewith whereby said cutting tool is firmly guided and steadied in its operation upon said work pieces and smooth flat surfaces are milled.

12. In an automatic chucking machine, a spindle carrier adapted to be indexed and having a plurality of chucks for holding work pieces, a tool slide movable towards and away from said spindle carrier and supporting a plurality of tools adapted to perform various operations upon said work piece in each of the different indexed positions, gear means for rotating said chucks, a rotating cutting tool supported on said tool slide for cutting polygonal surfaces on said work pieces at one of the indexed positions, gear means for rotating said cutting tool as the cutting tool operates upon the work piece, a housing for said cutting tool gears filled with lubricant and sealed therein, and a reservoir connected to said housing for maintaining said housing filled with lubricant, said cutting tool gears acting as a pump to circulate the lubricant through said housing and reservoir and under slight pressure whereby backlash in the cutting tool gears is eliminated and smooth flat surfaces are milled by said cutting tool on the work pieces.

13. In an automatic chucking machine, a spindle carrier adapted to be indexed and having a plurality of chucks for holding work pieces, a tool slide movable towards and away from said spindle carrier and supporting a plurality of tools adapted to perform various operations upon said work piece in each of the different indexed positions, gear means for rotating said chucks, a rotating cutting tool supported on said tool slide for cutting polygonal surfaces on said work pieces at one of the indexed positions, gear means for rotating said cutting tool as the cutting tool operates upon the work piece, a housing for said cutting tool gears filled with lubricant and sealed therein, and a lubricant reservoir connected to said housing, said cutting tool gears acting in the manner of a pump to circulate the lubricant through said housing and said reservoir to maintain the housing constantly filled with lubricant and under slight pressure, said lubricant serving to retard said gears and eliminate backlash therein whereby the cutting tool is adapted to mill smooth flat surfaces on the work pieces, and a lubricant pocket formed in said housing for creating back pressure to the circulation of lubricant and assist in eliminating backlash in the gears.

JAMES J. SWARTZ.
WALTER E. SEAMAN.

REFERENCES CITED

The following references are of record in the file of this patent:

UNITED STATES PATENTS

| Number | Name | Date |
| --- | --- | --- |
| 1,144,131 | Hunter | June 22, 1915 |
| 1,485,687 | Melling | Mar. 4, 1924 |
| 1,531,565 | Melling | Mar. 31, 1925 |
| 1,568,935 | Udall | Jan. 5, 1926 |
| 2,096,134 | Raber et al | Oct. 19, 1937 |
| 2,423,696 | Fink | July 8, 1947 |